United States Patent [19]

Mittermaier

[11] Patent Number: 5,215,655
[45] Date of Patent: Jun. 1, 1993

[54] DISPENSER INTERLOCK FUEL FILTER SYSTEM DISABLED IN RESPONSE TO FILTER REMOVAL

[75] Inventor: Armin E. Mittermaier, Fort Wayne, Ind.

[73] Assignee: Tokheim Corporation, Fort Wayne, Ind.

[21] Appl. No.: 783,408

[22] Filed: Oct. 28, 1991

[51] Int. Cl.⁵ ............................................ B01D 35/157
[52] U.S. Cl. .................... 210/234; 137/234.6; 137/493; 137/901; 210/100; 210/117; 210/435
[58] Field of Search ............... 210/109, 110, 117, 136, 210/148, 172, 232, 342, 234, 235, 100, DIG. 17, 435; 137/234.6, 493, 901; 251/149.6

[56] References Cited

U.S. PATENT DOCUMENTS

| | | | |
|---|---|---|---|
| 1,463,006 | 7/1923 | Dardani | 210/117 |
| 1,546,527 | 7/1925 | Werner | 210/136 |
| 1,613,166 | 4/1927 | Gregory | 210/136 |
| 1,617,048 | 2/1927 | Gregory | 210/136 |
| 1,699,097 | 1/1929 | Cravey et al. | 137/234.6 |
| 2,591,248 | 4/1952 | Francois | 210/234 |
| 2,667,125 | 1/1954 | Foss et al. | 210/136 |
| 2,955,712 | 10/1960 | Gutkowski | 210/234 |
| 2,991,885 | 7/1961 | Gutkowski | 210/133 |
| 3,040,894 | 6/1962 | Pall | 210/90 |
| 3,272,337 | 9/1966 | Elwell | 210/136 |
| 3,363,762 | 1/1968 | Ensign | 210/234 |
| 4,529,514 | 7/1985 | Gruett | 210/232 |
| 4,529,515 | 7/1985 | Selz | 210/234 |
| 5,122,264 | 6/1992 | Mohr et al. | 137/234.6 |
| 5,132,009 | 7/1992 | Futa et al. | 210/100 |

Primary Examiner—Joseph W. Drodge
Attorney, Agent, or Firm—Baker & Daniels

[57] ABSTRACT

A liquid fuel filter system for use in fuel dispensing stations including a ball valve assembly and replaceable strainer cartridge permitting strainer cartridge replacement even if the associated fuel pump is activated. The ball valve assembly seals the inlet port of the filter housing thereby disabling the flow of fuel through the housing when the strainer cartridge or filter housing cap are removed. A check valve prevents fuel from flowing back thorough the filter system outlet port into the filter housing. A pressure valve disposed in the check valve prevents possible harmful pressure build up.

18 Claims, 2 Drawing Sheets

DISPENSER INTERLOCK FUEL FILTER SYSTEM DISABLED IN RESPONSE TO FILTER REMOVAL

BACKGROUND OF THE INVENTION

The present invention relates generally to a filter installation for a liquid fuel dispensing system and more particularly to such a system having an automatic fuel shutoff valve which shuts off fuel flow when a filter element is replaced.

Fluid dispensers for dispensing fuels such as gasoline, fuel oil, and the like are well known in the art and over a period of years have experienced a substantial evolution in design. Most liquid fuel dispensing equipment generally includes a pump connected to a fuel reservoir, a valved nozzle adapted to be inserted in the fuel pipe of a vehicle fuel tank, and a flexible fuel hose connected between the pump outlet pipe and the valve nozzle.

In current fuel dispensing installations, such as in gasoline service stations, there are generally one or more "islands". Each island includes a plurality of conventional metering consoles in which each console includes a nozzled dispensing hose. A filter and/or a strainer is located within each individual console cabinet and is designed to filter the gasoline that is dispensed through the nozzle.

Periodically, the filters of each console require servicing. When it is desired to change a filter or strainer any particular console, it is necessary to block off the to minimize the risk of being struck by a motor vehicle. In addition, the island is blocked off to prevent any further consoles within the island from being utilized. A problem with blocking off an entire island is that vehicle traffic is often impeded throughout the remainder of the service station.

When changing a filter or strainer, the console cabinet is removed, and the filter is unscrewed from the fuel conduit located within the dispenser. At this point the fuel line is open. In the event that improper procedures are followed in blocking off the island, a customer may use another console at the same island. Therefore, there is the possibility that the submerged pump will begin pumping gasoline through the open fuel line and onto the servicing technician.

In addition to potential safety problems, there is a possibility that fuel may be spilled onto the ground when removing filters from within the consoles, since there is fuel above the filter element that can run out when the filter system is opened. Presently, if more than one kilogram of fuel is spilled onto the ground, it must be reported to the EPA for corrective action. When removing filters from existing consoles, there is a possibility that fuel may be spilled onto the ground.

A current disadvantage is that most consoles have separate gasoline fuel strainers for catching large particles in the fuel and fuel filters for trapping small impurities in the fuel.

It is desired to provide a gasoline filter system in which the filters may be serviced and removed easier and with fewer product leaks.

SUMMARY OF THE INVENTION

The present invention overcomes the disadvantages of the above-described prior art by providing a fuel filter system in which the fuel flow is automatically disabled upon servicing or removal of the stainer cartridge that is located within the fuel metering console.

Generally, the invention provides a fuel filtering system for use as a means for filtering fuel at gasoline service stations. The system includes a filter housing into which a replaceable strainer cartridge is disposed. A disabling means is disposed within the filter housing, preventing fluid flow when the strainer cartridge is removed for servicing.

In one form of the invention, a ball valve assembly is disposed within the filter housing inlet. When the strainer cartridge is inserted into the filter housing, the strainer cartridge presses a ball of the ball valve assembly open to allow fuel to flow through the strainer cartridge and out through the filter housing. When the strainer cartridge is not disposed within the filter housing, a spring of the ball valve assembly moves the ball against a ball seat to close the ball valve assembly, thereby preventing fuel flow through the filter housing.

In another form of the invention, the fuel system include a check valve disposed within the filter housing and the filter housing outlet that prevents reverse fuel flow from the metering consoles into the fuel housing when the strainer cartridge is removed.

An advantage of the fuel filter system of the present invention is that the fuel flow is automatically disabled upon strainer or filter cartridge removal, thereby protecting the service technician from being sprayed with gasoline by inadvertent operation of the fuel pump.

Another advantage of the fuel filtering system of the present invention is that the check valve prevents fuel from the gasoline metering console from filling the filter housing when the strainer cartridge is removed.

Another advantage of the dispensing system of the present invention is that only one filter assembly is utilized for filtering the fuel to each metering console, thereby reducing the number of parts and overall cost of providing filtered fuel.

The invention, in one form thereof, provides a fuel filter system for use as the filtering means in gasoline service stations. The fuel filter system includes a strainer means such as a strainer cartridge for filtering the fuel, a filter in which the strainer cartridge is disposed, and a disabling means such as a ball valve for automatically disabling fuel flow through the filter housing upon removal of the strainer cartridge. The filter housing includes a cap for providing access to the housing chamber for removal of the strainer cartridge.

In one aspect of the previously described form of the invention, the ball valve includes a ball seat disposed within the filter housing with a ball located under the ball seat biased by a conical spring. The conical spring is held in place by a retaining ring to prevent fuel flow when the strainer cartridge is not disposed within the filter housing.

In accord with another aspect of the invention, the strainer cartridge is insertable into the housing chamber. The strainer cartridge or straining means comprises a fuel filter and fuel strainer or only a fuel filter or only a fuel strainer.

According to a further aspect of the invention, the filtering means is adapted to stop fuel flow when the cap on the filter housing is opened.

In accord with another aspect of the invention, a check valve is disposed within the filter housing to prevent reverse fuel flow when the strainer cartridge is removed. The check valve includes a pressure relief valve to prevent fuel pressure build up in the outlet port caused by a temperature increase in the fuel and metering console.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

DESCRIPTION OF THE PREFERRED EMBODIMENT

Figure 1:
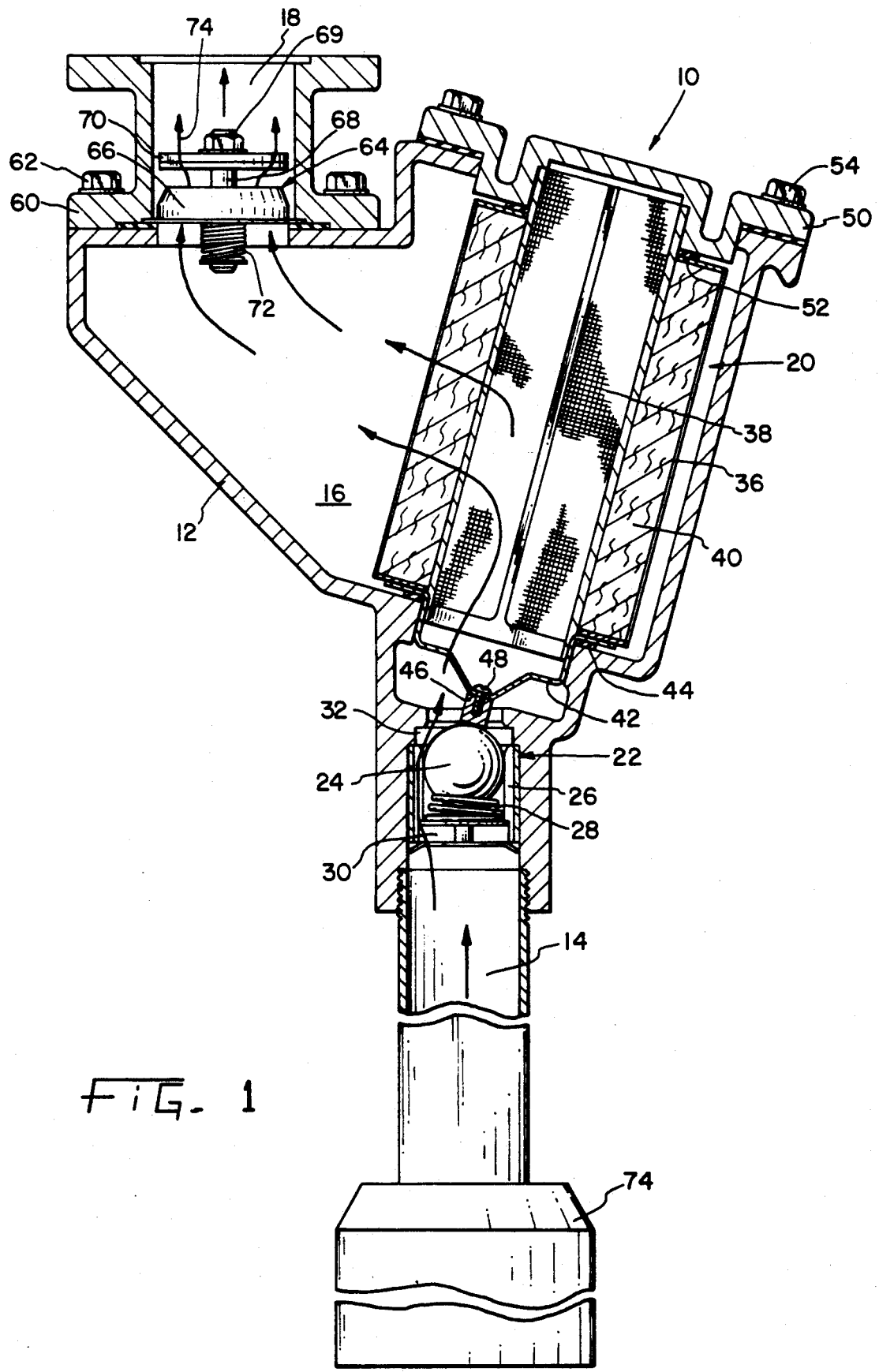
FIG. 1 is side elevational view of an embodiment of the present invention with the strainer cartridge in place.

Referring to FIG. 1, there is shown a liquid fuel filter system 10 having a housing generally designated at 12. Housing 12 has a inlet port 14, a housing chamber 16, and an outlet 18. Within housing 12 is a strainer means such as a strainer cartridge 20 for straining the fuel that flows from inlet 14.

Figure 2:
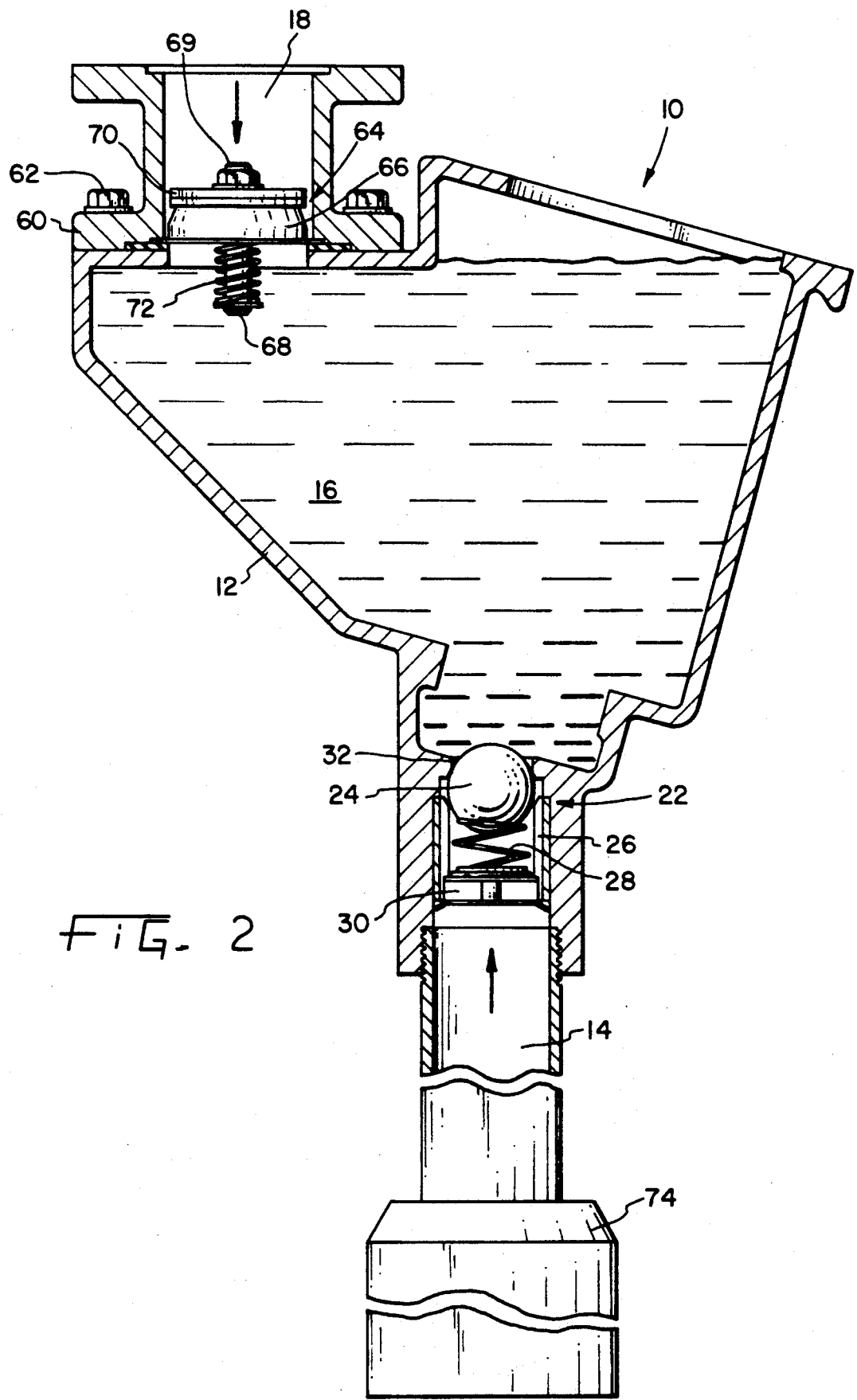
FIG. 2 is a side elevational view of an embodiment of the present invention without the strainer cartridge in place.

Within inlet 14 is a ball valve assembly 22 that acts as a disabling means for automatically stopping the fuel flow through the filter housing 12 when strainer cartridge 20 is not fully in place. Ball valve assembly 22 comprises a ball 24, ball guide 26, conical spring 28, and a retaining ring 30. Formed within inlet 14 is a ball seat 32 upon which ball 24 can effectively seal against when strainer cartridge 20 and mounting bracket 42 are not in place. Retaining ring 30 attaches inside inlet 14. Conical spring 28 between retaining ring 30 and ball 24 moves ball 24 against ball seat 32 to prevent fluid flow, as shown in FIG. 2 when strainer cartridge 20 and mounting bracket 42 are not in place.

Strainer cartridge 20 is constructed of an outer support screen 36 containing strainer screen 38. Strainer screen 38 is used to eliminate large dirt and rust particles from the fuel. Between strainer screen 38 and outer support screen 36 there is located a filter barrier 40 made of paper to eliminate small impurities in the fuel. The strainer cartridge 20 can alternatively be made of only a strainer screen or only a filter paper element.

On the bottom of outer support screen 36 is a mounting bracket 42 which has a strainer gasket 44 to prevent mixture of filtered and unfiltered fuel. In the embodiment shown in FIGS. 1 and 2, mounting bracket 42 and strainer cartridge 20 are an integral unit. However, mounting bracket 42 and strainer cartridge 20 need not comprise an integral unit. At the center point of the mounting bracket 42 is attached a valve block 46 by means of a screw 48.

The strainer cartridge 20 is inserted into the housing 12 through an opening sealed by cap 50. Mounting bracket 42 on the bottom of support screen 36 of strainer cartridge 20 slides within annular shoulder 13 of housing 12 with valve block 46 contacting ball 24. A strainer gasket 52 again separates filtered fuel from unfiltered fuel. Cap 50 is attached to housing 12 by means of bolts 54. A cap gasket 56 seals between the filter housing 12 and cap 50. Thus, as shown in FIG. 1, when strainer cartridge 20 with mounting bracket 42 thereunder is in an installed position, strainer cartridge 20 and mounting bracket 42 are located between housing 12 and cap 50 and move ball 24 away from ball seat 32.

An adapter 60 is attached to housing 12 around outlet 18 means of bolts 62. Adapter 60 holds check valve 64 in place in outlet 18. Check valve 64 allows fluid flow from housing chamber 16 through outlet 18. Check valve 64 prevents reverse fluid flow from outlet 18 back into housing chamber 16.

Check valve 64 comprises an annular back plate 66 into which check valve stem 68 is inserted. Attached to check valve stem 68 above annular back plate 66 is valve plate 70. Attached to the valve stem 68 behind back plate 66 is check valve spring 72 which effectively holds valve stem 68 within back plate 66. Back plate 66 has a number of axial holes (not shown) that allow fluid to pass from housing chamber 16 through the check valve 64 (represented by fuel flow directional arrows 74). As will be appreciated by those skilled in the art, the check valve spring 72 shown in FIGS. 1 and 2 is a compression spring which exerts an axial force against valve stem 68 and moves valve plate 70 into sealing contact with back plate 66 when fuel is not flowing through ball valve assembly 22 and housing 12. Moreover, if the outlet 18 and check valve 64 are disposed in a vertical orientation, as shown in FIGS. 1 and 2, the weight or pressure of the fuel within outlet 18 may coact with the forces exerted by the check valve spring 72 against the check valve stem 68 to move the check valve to a closed position (FIG. 2). Valve stem 68 preferably includes a pressure relieving valve 69 of a type well known in the art that prevents a buildup of fluid pressure from the dispenser apparatus connected to the outlet port 18.

During normal operation of filtered systems, fuel is pumped from a fuel reservoir (not shown) by means of a pump generally designated at 74. Fuel flows from pump 74 through inlet 14, through retaining ring 30 and past ball 24. Ball 24 is held away from ball seat 32 by valve block 46 attached to mounting bracket 42 on outer support screen 36 of strainer cartridge 20. Fuel then flows through strainer screen 38, filter paper barrier 40, then into housing chamber 16. Fluid pressure forces fuel through check valve 64 pushing valve plate 70 away from check valve back plate 66. Fuel then flows to the gasoline metering device and console at a typical gasoline service station.

The flow disabling means, the ball valve assembly 22, is activated when strainer cartridge 20 is removed from housing chamber 16. To remove the strainer cartridge 20, one must unscrew bolts 54 to take cap 50 off of housing 12. When cap 50 is removed, conical spring 28 pushes ball 24, mounting bracket 42, and strainer cartridge 20 upward and ball 24 comes into sealing engagement with ball seat 32 since strainer cartridge 20 would not be retained in a position biasing ball 24 as shown in FIG. 1.

Check valve 64 closes when cap 50 is opened. Without constant fuel pressure from pump 74, the force exerted by conical spring 72 against valve stem 68 and/or the weight of the fuel above the check valve 64 will push valve plate 70 into sealing contact with back plate 66.

FIG. 2 shows the fuel filter system 10 with the strainer cartridge 20 and cap 50 removed. Since there is no fluid flow through check valve back plate 66, the force exerted by conical spring 72 against valve stem 68 and/or the weight of the fuel above valve plate 70 fuel from flowing through outlet port 18. Since no fuel is flowing into housing chamber 16, no fuel will be pumped out of filter housing 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A liquid fuel filter system comprising:
   strainer means for filtering fuel engaging a bracket support;
   a filter housing comprising a housing chamber, an inlet port passage narrowing to form a valve seat, and an outlet port, said strainer means disposed inside said housing chamber to filter fuel;
   disabling means connected to said filter housing for automatically disabling fuel flow through said filter housing upon removal of said strainer means from said housing, said disabling means comprising a ball valve assembly, said ball valve assembly disposed within said filter housing inlet port passage, said ball valve assembly arranged to automatically prevent fuel flow upon removal of said strainer means from said housing chamber and allowing fuel flow when said strainer means is disposed within said housing chamber by movement into and out of engagement with said seat.

2. The fuel filter system according to claim 1 wherein said ball valve assembly comprises:
   a ball seat disposed within said filter housing,
   a ball located under said ball seat and adapted to seal in said ball seat when said strainer means is not disposed in said housing chamber,
   a conical spring located under said ball and adapted to bias said ball toward said ball seat when said strainer means is not disposed in said housing,
   a retaining ring attached to said filter housing, under said conical spring to provide a base for said conical spring to bias said ball toward said ball seat.

3. The fuel filter system according to claim 1 wherein said strainer means comprises a changeable strainer cartridge insertable in said housing chamber.

4. The fuel filter system according to claim 1 wherein a check valve is disposed in said filter housing sealable within said outlet port to stop fuel flow from said outlet port into said filter housing.

5. The fuel filter system according to claim 4 wherein said check valve includes a pressure relieving valve to prevent fuel pressure buildup within said outlet port.

6. The fuel filter system according to claim 1 wherein said strainer means comprises a fuel filter and a fuel strainer.

7. A liquid fuel filter system comprising:
   filter means for filtering a flow of fuel, said filter means comprising a strainer means engaging a bracket support, said filter means adapted to stop fuel flow through said liquid fuel filter system when said strainer means is removed from said filter system, said filter means further comprising a ball valve assembly and a filter housing, said filter housing having a housing chamber, an inlet port passage narrowing to form a valve seat and an outlet port, said ball valve assembly disposed in said inlet port passage for selectively sealing said inlet port, said strainer means contacting said ball valve assembly allowing fuel flow through said inlet port, and said ball valve assembly arranged to prevent fuel flow when said strainer means is removed from said housing chamber by movement into engagement with said seat.

8. The fuel filter system according to claim 7 wherein said ball valve assembly comprises:
   a ball seat disposed within said filter housing,
   a ball located under said ball seat and adapted to seal in said ball seat when said strainer means is not disposed in said housing chamber,
   a conical spring located under said ball and adapted to bias said ball toward said ball seat when said strainer means is not disposed in said housing,
   a retaining ring attached to said filter housing, under said conical spring to provide a base for said conical spring to bias said ball toward said ball seat.

9. The fuel filter system according to claim 8 wherein said strainer means comprises a changeable strainer cartridge insertable in said housing chamber.

10. The fuel filter system according to claim 8 wherein said filter housing includes a detachable cap attached to said filter housing adjacent said strainer means for providing access to said housing chamber for removal of said strainer means, said cap retaining said strainer means in a position to permit fuel flow when said cap is attached to said housing.

11. The fuel filter system according to claim 8 wherein a check valve is disposed in said filter housing sealable within said outlet port to stop fuel flow from said outlet port into said filter housing when fuel flow through said inlet port is prevented.

12. The fuel filter system according to claim 11 wherein said check valve includes a pressure relieving valve to prevent fuel pressure buildup within said outlet port.

13. The fuel filter system according to claim 8 wherein said strainer means comprises a fuel filter and a fuel strainer.

14. A liquid fuel filter system comprising:
   strainer means for filtering fuel, said strainer means comprising a changeable strainer cartridge;
   a filter housing comprising a housing chamber, an inlet port passage narrowing to form a valve seat, and an outlet port, said strainer means disposed inside said housing chamber to filter fuel engaging a bracket support;
   a ball valve assembly means disposed in said filter housing inlet port passage and arranged for automatically disabling fuel flow through said filter housing upon removal of said strainer means from said filter housing by movement into engagement with said seat;
   a detachable cap attached to said filter housing adjacent said strainer means for providing access to said housing chamber for removal of said strainer means;
   a check valve disposed in said filter housing for sealing said outlet port to stop fuel flow from said outlet port into said filter housing when said strainer means is removed, said check valve including a pressure relieving valve to prevent fuel pressure buildup within said outlet port.

15. The fuel filter system according to claim 14 wherein said ball valve assembly comprises:
   a ball seat disposed within said filter housing, a ball located under said ball seat and adapted to seal in said ball seat when said strainer means is not disposed in said housing chamber, a conical spring located under said ball to bias said ball toward said ball seat when said strainer means is not disposed in said housing, a retaining ring attached to said filter housing, under said conical spring to provide a base for said conical spring to bias said ball toward said ball seat.

16. The fuel filter system according to claim 14 wherein said strainer means comprises a fuel filter and a fuel strainer.

17. A liquid fuel filter system comprising:

a filter housing including a housing chamber, an inlet port, an outlet port, and a detachable cap;

a disabling means comprising a ball valve assembly disposed in said filter housing inlet port passage; and a strainer means for filtering fuel, said strainer means removably disposed within said housing chamber of said filter housing between said detachable cap and said disabling means and engaging a bracket support, said strainer means arranged to coact with said ball valve assembly to allow fuel flow through said filter housing when said strainer means is disposed within said housing chamber, and to prevent fuel flow through said filter housing when said strainer means is removed from said housing chamber by allowing movement of said valve assembly into and out of engagement with said valve seat.

18. The liquid fuel filter system of claim 17 further comprising a check valve disposed in said outlet port for preventing fuel flow form said outlet port into said housing chamber.

* * * * *

UNITED STATES PATENT AND TRADEMARK OFFICE
CERTIFICATE OF CORRECTION

PATENT NO. : 5,215,655
DATED : June 1, 1993
INVENTOR(S) : Armin E. Mittermaier

It is certified that error appears in the above-identified patent and that said Letters Patent is hereby corrected as shown below:

In claim 1, column 5, line 13, after "fuel", delete "engaging a bracket support".

In claim 1, column 5, line 18, after "fuel" insert --engaging a bracket support--.

In claim 7, column 5, line 68, after "port" insert therefor --passage--.

In claim 17, column 7, line 20, after "port" insert --passage narrowing to form a valve seat--.

Signed and Sealed this

Eighteenth Day of January, 1994

BRUCE LEHMAN

*Attest:*

*Attesting Officer*     *Commissioner of Patents and Trademarks*